Patented Oct. 22, 1929

1,732,611

UNITED STATES PATENT OFFICE

ARTHUR J. MOXHAM, OF ODESSA, DELAWARE, ASSIGNOR TO ELECTRO COMPANY, A CORPORATION OF DELAWARE

METHOD OF PRODUCING IRON-FREE POTASH ALUM FROM SOLUTIONS CONTAINING FERRIC SULPHATE

No Drawing.   Application filed June 13, 1927. Serial No. 198,693.

My invention relates to the manufacture of potash alum and particularly to the production of potash alum which is substantially iron free, although produced from a solution containing in addition to potassium and aluminum sulphates, substantial quantities of ferric sulphate. Such solutions are, for example, the intermediate product in processes for treating such minerals as greensand to manufacture valuable salts and other products.

By crystallization alone it is almost impossible to secure a chemically pure product. Practical efficiency of crystallization depends upon certain approximately fixed specific gravities and fixed temperatures of the solution in which the crystals form and these values are difficult to maintain even approximately in carrying on large scale operations, because the very active crystallization induces a continually changing specific gravity in the mother liquor, while, as the process of crystallization is slow, there is as a rule a tendency to a continually changing temperature. Moreover, the difficulties of stabilizing these changing conditions by continuous evaporation or otherwise are greatly increased by the fact that the mother liquor must be maintained in a condition of almost perfect repose during the crystallization period. No matter how carefully the crystallization is carried on, the rejection of the contaminant grows proportionately less with each recrystallization, so that while crystallization may be a cheap method of extraction it cannot be completely effective. There is generally an irreducible minimum of the contaminant left behind.

It is known that ferric sulphate can be precipitated from a solution and such precipitation is in much greater measure a positive function. On the other hand, the use of any suitable precipitant to bring down all the iron contaminant contained in such solutions involves considerable expense.

My invention involves such a combination of the crystallizing and precipitating methods as produces a practical, rapid and efficient method of obtaining iron free potash alum. To this end I first effect a crystallization from the solution of mixed sulphates in the usual way but without any attempt to obtain extreme efficiency. Thus if the leaching and residue separation steps of the greensand are conducted with ordinary speed and the temperature maintained throughout the leaching operation, the mere cooling of the resultant clear solution will crystallize out most of the potash alum in more or less impure condition. The liquor from which this crude alum has been crystallized may be reused in the next leach of the mineral or may be otherwise treated to obtain pay products. Such crystallization, having involved only the cooling of the solution, is of negligible cost. However, the process of my present invention is also carried on if the solution of the mixed sulphates is relatively dilute and cold and evaporation methods are employed. In either case a potash alum is obtained which is contaminated by some of the iron sulphate. For instance, 1% of iron would be excessive for many purposes for which potash alum would be used, although this would mean only a total of one hundred pounds in a solution that weighs ten thousand pounds. This relatively small quantity of iron I eliminate by the more positive precipitation method for although precipitation would be entirely too costly when applied to the original solution, the cost is not great when applied to the small amount of iron remaining with the potassium sulphate. There are many known precipitants for this purpose, and I do not limit myself to any particular one or more of them. The crude potash alum crystals are redissolved in water and a suitable amount of precipitant, such as sodium sulfide or potassium sulfide, may be added, or precipitation can be effected by ammonia or by passing sulfuretted hydrogen through the solution or by any other suitable precipitant.

By a second crystallization, potash alum is obtained which is free of the iron contaminant.

By my method of partially purifying by crystallization during the early stages when the impurities are at their maximum, combined with the more effective method of precipitation towards the finish of the purifying when only a small quantity of the contaminant remains for elimination, I obtain economy in the use of the reagent and of extreme purity, neither of which could be reached with reasonable economy where crystallization and precipitation were alone depended upon.

Having thus described my invention what I claim, and desire to protect by Letters Patent, is:

The method of producing potash alum from solutions of potassium, aluminum and ferric sulphates which consists in first crystallizing out crude potash alum, then redissolving the crystals in water, then adding sufficient quantity of a reagent suitable to react with the ferric sulphate and precipitate the iron compound thus produced, then separating the precipitate from the solution and crystallizing out iron free potash alum.

In testimony whereof, I have signed my name to this specification.

ARTHUR J. MOXHAM.